(12) United States Patent
Feferberg et al.

(10) Patent No.: US 11,964,228 B2
(45) Date of Patent: Apr. 23, 2024

(54) SMOKE CAPTURING SYSTEM AND METHOD

(71) Applicants: IZUN PHARMACEUTICALS CORP., New York, NY (US); Ilan Feferberg, Rishon LeZion (IL); William Levine, Jerusalem (IL); Shimon Lecht, Petah Tikva (IL)

(72) Inventors: Ilan Feferberg, Rishon LeZion (IL); William Levine, Jerusalem (IL); Shimon Lecht, Petah Tikva (IL)

(*) Notice: Subject to any disclaimer, the term of this patent is extended or adjusted under 35 U.S.C. 154(b) by 218 days.

(21) Appl. No.: 16/758,961

(22) PCT Filed: Oct. 25, 2018

(86) PCT No.: PCT/IL2018/051142
§ 371 (c)(1),
(2) Date: Apr. 24, 2020

(87) PCT Pub. No.: WO2019/082187
PCT Pub. Date: May 2, 2019

(65) Prior Publication Data
US 2020/0324242 A1    Oct. 15, 2020

(30) Foreign Application Priority Data
Oct. 26, 2017   (IL) .......................... 255268

(51) Int. Cl.
*B01D 47/06* (2006.01)
*A24F 42/90* (2020.01)
(Continued)

(52) U.S. Cl.
CPC .......... *B01D 47/06* (2013.01); *B01D 5/0027* (2013.01); *B01D 5/0057* (2013.01);
(Continued)

(58) Field of Classification Search
CPC ........ A24F 40/00; A24F 40/465; A24F 42/90; B01D 5/0057; B01D 53/02; B01D 53/18;
(Continued)

(56) References Cited

U.S. PATENT DOCUMENTS 2,365,483 A * 12/1944 Fritz ................... B01D 47/085
                                                           261/36.1
3,674,657 A    7/1972 Viobin
(Continued)

FOREIGN PATENT DOCUMENTS

| DE | 2256111 | 6/1974 |
| WO | WO 2016161420 A1 | 10/2016 |
| WO | WO 2017192527 A1 | 11/2017 |

OTHER PUBLICATIONS

R. Haus, K. Schäfer, W. Bautzer, J. Heland, H. Mosebach, H. Bittner, and T. Eisenmann, "Mobile Fourier-transform infrared spectroscopy monitoring of air pollution," Appl. Opt. 33, 5682-5689 (1994).*

(Continued)

*Primary Examiner* — Jonathan Luke Pilcher
(74) *Attorney, Agent, or Firm* — JMB Davis Ben-David

(57) ABSTRACT

A vapor/smoke capturing trap system featuring a smoke chamber trap for precipitating the smoke dispersed in the chamber. The chamber includes a bottom pool for containing a reservoir of a liquid solvent, and a gas filled portion in which a lower smog portion contains fog-sized droplets of the liquid solvent and into which the smoke is introduced, and an upper clear portion in which the concentration of the smoke and the droplets is decreased, respective of their concentration in the smog portion. A fog-condenser, disposed between the smog portion and the clear portion, precipitates the fog droplets of the smog portion into the pool. A fine mist generator streams a jet of fog-sized droplets of the liquid solvent mixed with smoke toward a concen- (Continued)

tration of the smoke at the smog portion. A closed loop gas circulator withdraws gas from the clear portion and recirculates the gas under pressure through the fine mist generator into the smog portion. Fresh smoke is introduced into the gas circulator via a smoke conveying conduit. A complementary smoke capturing method includes filling the reservoir, streaming the jet of fog-sized droplets toward a concentration of smoke dispersed within the lower smog portion of the gas filled portion, precipitating droplets, in the smog portion, into the pool by a fog-condenser disposed between the lower smog portion and the upper clear portion of the gas filled portion, recirculating under pressure, in a closed loop gas circulator, gas withdrawn from the clear portion into the smog portion through the fine mist generator, and conducting fresh smoke via smoke conveying conduit into the gas circulator.

13 Claims, 9 Drawing Sheets

(51) Int. Cl.
| | | |
|---|---|---|
| *B01D 5/00* | (2006.01) | |
| *B01D 53/18* | (2006.01) | |
| *C10B 53/02* | (2006.01) | |
| *C11B 1/10* | (2006.01) | |
| *A24F 42/60* | (2020.01) | |

(52) U.S. Cl.
CPC ............ *B01D 53/185* (2013.01); *C10B 53/02* (2013.01); *C11B 1/10* (2013.01); *A24F 42/60* (2020.01); *A24F 42/90* (2020.01); *B01D 2252/103* (2013.01); *B01D 2252/20* (2013.01); *B01D 2252/2021* (2013.01); *B01D 2252/2028* (2013.01); *B01D 2252/2053* (2013.01); *B01D 2252/504* (2013.01)

(58) Field of Classification Search
CPC ............ B01D 53/185; B01D 2011/007; B01D 11/0203; B01D 47/05–18; B01D 53/76; B01D 53/77; B01D 53/78
See application file for complete search history.

(56) References Cited

U.S. PATENT DOCUMENTS

| | | | | |
|---|---|---|---|---|
| 3,678,658 | A * | 7/1972 | Bayze | F01N 3/04 261/92 |
| 3,695,004 | A * | 10/1972 | DeLisio | B01D 47/06 96/252 |
| 4,328,255 | A | 5/1982 | Roselius | |
| 5,235,992 | A | 8/1993 | Sensabaugh, Jr. | |
| 5,516,923 | A | 5/1996 | Hebert | |
| 6,676,838 | B2 | 1/2004 | Corr | |
| 8,012,248 | B2 * | 9/2011 | Yun | F01N 3/037 96/244 |
| 2008/0250933 | A1 * | 10/2008 | Yun | F01N 3/04 96/282 |
| 2015/0265720 | A1 * | 9/2015 | Levine | A61K 36/185 514/15.2 |
| 2016/0250564 | A1 * | 9/2016 | Thomas | B01D 11/028 554/8 |
| 2018/0078874 | A1 * | 3/2018 | Thomas | B01D 1/16 |
| 2021/0283527 | A1 * | 9/2021 | Cohen | C10B 53/02 |

OTHER PUBLICATIONS

International Search Report issued in International Application No. PCT/US/PCT/IL2018/051142, dated Dec. 18, 2018.
Written Opinion of the International Searching Authority issued in International Application No. PCT/US/PCT/IL2018/051142, dated Dec. 18, 2018.

* cited by examiner

| Constituent | Full name | example of inflorescence | example of yields | |
|---|---|---|---|---|
| | | mg cannabinoids / g inflorescence | % capturing yield | % extraction yield |
| CBDA | Cannabidiolic acid | 10.4 | 0% | 100.0% |
| CBGA | Cannabigerolic acid | 3.1 | 0% | 98.9% |
| CBG | Cannabigerol | 36.6 | 5% | 97.1% |
| CBD | Cannabidiol | 0.0 | #DIV/0! | #DIV/0! |
| CBN | Cannabinol | 3.4 | 454% | 99.4% |
| THCA | Tetrahydrocannabinolic acid | 103.3 | 0% | 99.8% |
| Δ9-THC | Delta9-Ttrahydrocannabinol | 23.3 | 358% | 99.8% |
| Δ8-THC | Delta8-Ttrahydrocannabinol | 0.0 | #DIV/0! | #DIV/0! |
| CBC | Cannabichromene | 0.2 | 116% | 99.7% |
| Total THC | | 113.88 | 73.3% | 99.8% |
| Total CBD | | 9.13 | 80.0% | 100.0% |
| Total Cannabinoids | | 180.34 | 60.1% | 99.6% |

Table I percentage capturing and extraction yield for major constituents

FIG. 8

SMOKE CAPTURING SYSTEM AND METHOD

CROSS REFERENCE TO RELATED APPLICATIONS

The present application is a § 371 National Phase application based on PCT/IL2018/051142 filed Oct. 25, 2018, which claims the benefit of Israel application No. 255268 filed Oct. 26, 2017 the subject matter of each of which is incorporated by reference in their entirety.

FIELD OF THE DISCLOSED TECHNIQUE

The present invention relates to systems and methods for capturing and collecting vapor and smoke. More particularly, the present invention relates to a system and method used for capturing vapor, fume and smoke by dissolving or mixing with solvents.

BACKGROUND OF THE DISCLOSED TECHNIQUE

Various plants have been found to contain compounds (e.g., molecular entities or molecular complexes) having pharmaceutical, therapeutic and/or cosmetic properties. Historically, certain compounds found in plants have been extracted for human administration through combustion, also referred to as smoking or vaporizing. Smoking of plant matter is typically achieved by rolling the plant matter into a cigarette and ignition of the cigarette, or through using a smoking apparatus such as a water pipe. Vaporization of a plant matter is typically achieved through use of a vaporizer configured to contain a discreet amount of plant matter which is heated by air that is sufficiently hot to vaporize the compound but insufficiently hot to cause the plant matter (or most of it) to ignite, whereby the outgoing hot air carrying the vaporized compound is then either actively or passively cooled and subsequently inhaled by the user.

Compositions for pharmaceutical, therapeutic and/or cosmetic use including compounds from plant matter may be prepared from plants using various methods including solvent extraction and distillation methods.

Various apparatuses and methods are available nowadays for extraction of essential material from plants. For instance, FIG. 1 depicts a prior art smoking device 100 for obtaining smoke of plant matter using a cigarette. Smoking device 100 includes a chamber 110, a cigarette holder 112, an air pump 114 and a smoke conduit 116. During operation of smoking device 100, a cigarette 120 is inserted into cigarette holder 112 and ignited at its distal end (A). Chamber 110 is a closed chamber having no other air inlet aside from smoke conduit 116. Air pump 114 is configured to withdraw air from chamber 110 via smoke conduit 116 to the outside of chamber 110, thereby creating a vacuum in chamber 110 and introducing smoke from ignited cigarette 120. At ignition, smoke travels from distal end through cigarette 120 and into chamber 110. Smoke may be analyzed or used within chamber 110. Optionally, smoke may be conveyed from chamber 110 via air pump 114 and smoke conduit 116 for further use or analysis.

A disadvantage of prior art smoking device 100 is that plant matter must be rolled into cigarettes in order to burn them, and loose plant matter cannot be used. An additional disadvantage is that cigarettes must be manually placed into cigarette holder 112 and the cigarette butt must then be removed from cigarette holder 112. Although a smoking device 100 may include multiple cigarette holders, in which cigarettes may be ignited in series in order to continuously provide smoke, cigarettes must be inserted and butts must be removed from the cigarette holders.

Another disadvantage of the smoking device 100 relates to the uniformity of smoke obtained. When a cigarette 120 is inserted into cigarette holder 112 and ignited, the smoke travels from point A on the cigarette, to point C, and then into chamber 110. As the smoke travels, it is cooled by the plant matter located between point A and point C. Plant matter smoke typically includes compounds having varying boiling temperature. As the smoke cools, compounds with higher boiling temperature are condensed upon the plant matter and compounds with lower boiling temperature proceed through the cigarette into chamber 110. However, when cigarette 120 burns down to point B, the distance that the generated smoke has to travel is from point B to point C, which is a shorter distance than from point A to point C. As a result, a larger fraction of high boiling temperature compounds enters the chamber 110 than when the cigarette 120 burns at point A. This leads to a lack of uniformity of smoke in chamber 110, as the nature of the smoke at a given time depends upon the length of the cigarette and the region of the cigarette being burnt at a given time.

Additional apparatuses and processes of extracting compounds from plants for different uses are disclosed in the following prior-art publications:

U.S. Pat. No. 4,328,255 describes a method of extracting coffee oil containing aromatic constituents in high yield and in stable form by extracting solid, roasted coffee with dry carbon dioxide under super-critical conditions of temperature and pressure.

U.S. Pat. No. 6,676,838 discloses an apparatus for extracting biomass. The apparatus includes an extractor, evaporator, compressor, and condenser connected in series of pipework to define a closed loop extraction circuit.

DE Patent Publication No. 2256111 discloses a process and applications for the solvent extraction of immiscible liquids.

U.S. Pat. No. 5,516,923 describes a process for extracting oil from an oil bearing plant material with the use of a solvent suitable for dissolving the oil in the plant material.

SUMMARY OF THE DISCLOSED TECHNIQUE

In accordance with the disclosed technique there is thus provided a vapor/smoke ("smoke") capturing "trap" system featuring a smoke chamber trap for precipitating the smoke dispersed in the chamber. The chamber includes a bottom pool for containing a reservoir of a liquid solvent, and a gas filled portion in which a lower smog portion contains "fog-sized" droplets of the liquid solvent and into which the smoke is introduced, and an upper clear portion in which the concentration of the smoke and the droplets is decreased, respective of their concentration in the smog portion. A fog condenser disposed between the smog portion and the clear portion precipitates the fog droplets of the smog portion into the pool. A fine mist generator is used for streaming a jet of fog-sized droplets of the liquid solvent mixed with smoke toward a concentration of the smoke at the smog portion. A closed loop gas circulator withdraws gas from the clear portion and recirculates the gas under pressure through the fine mist generator into the smog portion. Fresh smoke is introduced into the gas circulator via a smoke conveying conduit.

Furthermore, in accordance with the present invention, the smoke trapping system may further include liquid solvent preliminary mixing circulator, for dispersing droplets of the solvent drawn from the reservoir into the gas circulator.

Furthermore, in accordance with the present invention, the fine mist generator may include:

(a) a fixed bottom element emerging upward from the bottom floor of the pool, including a first head disposed above the liquid level of the solvent in the reservoir, the first head is positioned at a first distance from the bottom of the floor, the first head includes an inlet-opening through which a jet stream of the closed loop gas circulator is continuously injected into the smog portion;

(b) an upper element, either stationary or movable, partially immersed in the reservoir of liquid solvent, the upper element includes a second head including an outlet-opening disposed in the path of the jet stream, the second head is positioned at a second distance from the bottom of the floor which is greater than the first distance such that a gap is disposed between the fixed bottom element and the upper element, the gap is operative to creates a negative-pressure upon streaming, and an injector fitted onto the inlet-opening through which the jet stream is continuously spurting prior to entering the smog portion, and (c) a surface positioned in front of the injector of the upper element for enhancing smoke association or dissolution in the liquid solvent by breaking down the droplets of the jet stream upon hitting the surface into tiny fog-sized liquid droplets and smoke-derived droplets and particles.

Furthermore, in accordance with the present invention, at least one of the first head and second head may be tapered. Furthermore, in accordance with the present invention, the jet stream may include gas with smoke and solvent droplets.

Furthermore, in accordance with the present invention, the fog-sized droplets may include a diameter ranging from 0.1 micrometer to 100 micrometer, and/or an average diameter of about 2 micrometer.

Furthermore, in accordance with the present invention, the diameter of the injector may be either constant, or varied for correspondingly varying the pressure of the jet stream of gas with smoke and solvent droplets.

Furthermore, in accordance with the present invention, the smoke capturing system may further include heating arrangement for continuously burning, and/or vaporizing matter for producing the fresh smoke for admission into said smoke conveying conduit, the heating arrangement includes weighing means for weighing the matter for producing the fresh smoke.

Furthermore, in accordance with the present invention, the heating arrangement may be configured to heat the matter at temperature pre-set at or lower than 230° C., or at a temperature which may cause a spontaneous combustion or ignition of the matter, or a spontaneous further increase in temperature.

Furthermore, in accordance with the present invention, the heating arrangement may be locked and operable with a code interface for preventing improper functioning.

Furthermore, in accordance with the present invention, the smoke capturing system may further include at least one pump for pumping liquid solvent from the pool to the fog condenser for precipitating and/or urging condensation of said fog-sized droplets.

Furthermore, in accordance with the present invention, the solvent may include at least one selected from the list consisting of ethanol, acetonitrile, propylene glycol, glycerol, water, methanol, organic solvent, and a combination of any of the above.

Furthermore, in accordance with the present invention, the smoke capturing system may further include at least one sprayer connected to the smoke conduit and/or to a liquid solvent conduit for mixing the smoke and liquid traversing the sprayer.

Furthermore, in accordance with the present invention, the smoke capturing system may further include a mixing chamber for enhancing dissolving of smoke into the liquid solvent, wherein the mixing chamber includes a mixing injector, the mixing injector includes multiple apertures through which the stream of smoke and liquid solvent passes, and wherein the apertures form areas of of: increased pressure in the stream to thereby assist in association of smoke with the liquid solvent.

Furthermore, in accordance with the present invention, the smoke capturing system may further include a controller for setting and controlling parameters, the parameters including at least one selected from the list consisting of: time duration of operation, total weight of matter to be processed, solvent weight before and after the process, pre-set temperature at the combustion chamber, pressure of liquids, gas pressure, vacuum pressure, weight of ash, the degree of turbidity of the solvent for indicating the absorption level of smoke, and optical means for qualitative or quantitative measurement of dissolved components.

Furthermore, in accordance with the present invention, the smoke capturing system may further include an internal conduit residue collection cleansing mechanism operative for washing the conduits with the liquid solvent for releasing smoke adhered to the sides of the conduits and circulating the liquid solvent with the released smoke through the conduits.

Furthermore, in accordance with the present invention, the smoke capturing system may further include at least one temperature sensor.

Furthermore, in accordance with another aspect of the present invention, there is provided a smoke capturing method which includes the procedures of:

(a) providing the above smoke chamber trap for capturing smoke dispersed in a gas filled portion in the chamber;

(b) filling a reservoir of a liquid solvent disposed in a bottom pool of the chamber;

(c) streaming by a fine mist generator a jet of fog-sized droplets of the liquid solvent mixed with the smoke toward a concentration of smoke dispersed within the lower smog portion of the gas filled portion, wherein the smog portion contains fog-sized droplets of the liquid solvent and into which smoke is to be introduced;

(d) precipitating droplets, in the smog portion, into the pool by a fog condenser disposed between the lower smog portion and the upper clear portion of the gas filled portion, thereby decreasing the concentration of the smoke and the fog-sized droplets in the clear portion, respective of their concentration in the smog portion;

(e) recirculating under pressure, in a closed loop gas circulator, gas withdrawn from the clear portion into the smog portion through the fine mist generator; and (f) conducting fresh smoke via smoke conveying conduit into the gas circulator at a smoke introduction junction.

Furthermore, in accordance with the present invention, the smoke capturing method may further include dispersing droplets of the liquid solvent drawn from the reservoir in the gas circulator downstream of the smoke introduction junction.

Furthermore, in accordance with the present invention, the procedure of streaming by a fine mist generator may further include (1) continuously injecting a jet stream of gas with smoke and solvent droplets from the closed loop gas circulator into the smog portion, through the fine mist generator;
(2) continuously spurting the jet stream through the injector of the upper element upon entering into the smog portion, wherein the jet stream creates a negative pressure in the gap between the fixed bottom element and the upper element, wherein the negative pressure withdraws the liquid solvent from the reservoir toward the injector, and the fine mist generator breaks down the jet stream into fog-sized particles having a relatively high surface to volume ratio.

BRIEF DESCRIPTION OF THE DRAWINGS

The disclosed technique will be understood and appreciated more fully from the following detailed description taken in conjunction with the drawings in which:

FIGS. 6, 7 and 8, present the measured presence of major constituents of inflorescence in a demonstrative system constructed and operative in accordance with the invention. The graphs of FIG. 6 illustrate results derived by high-pressure liquid chromatography (HPLC) and are derived from measuring optical absorption and presented in mAU (mill arbitrary units) as a function of retention time (minutes). The results are also presented for simplicity in the charts of FIG. 7 and are summarized in Table I of FIG. 8.

DETAILED DESCRIPTION OF THE EMBODIMENTS

The various systems and methods available nowadays are ineffective as the degree of extraction achieved is about 25% (for example extraction using super-critical $CO_2$). In addition, material to be burned or otherwise extracted has to be reloaded multiple times into the system during the process, as a result of which such process of trapping is cumbersome and not continuous.

It is an object of the present invention to provide a system and method for capturing smoke in a liquid solvent. The disclosed technique of the present invention provides a novel system and method for capturing (e.g., dissolving or mixing) smoke in liquid solvent, continuously, with a degree of extraction that can reach above 90%. Such system and method are simple, easy to operate, rapid, and efficient.

Figure 1:
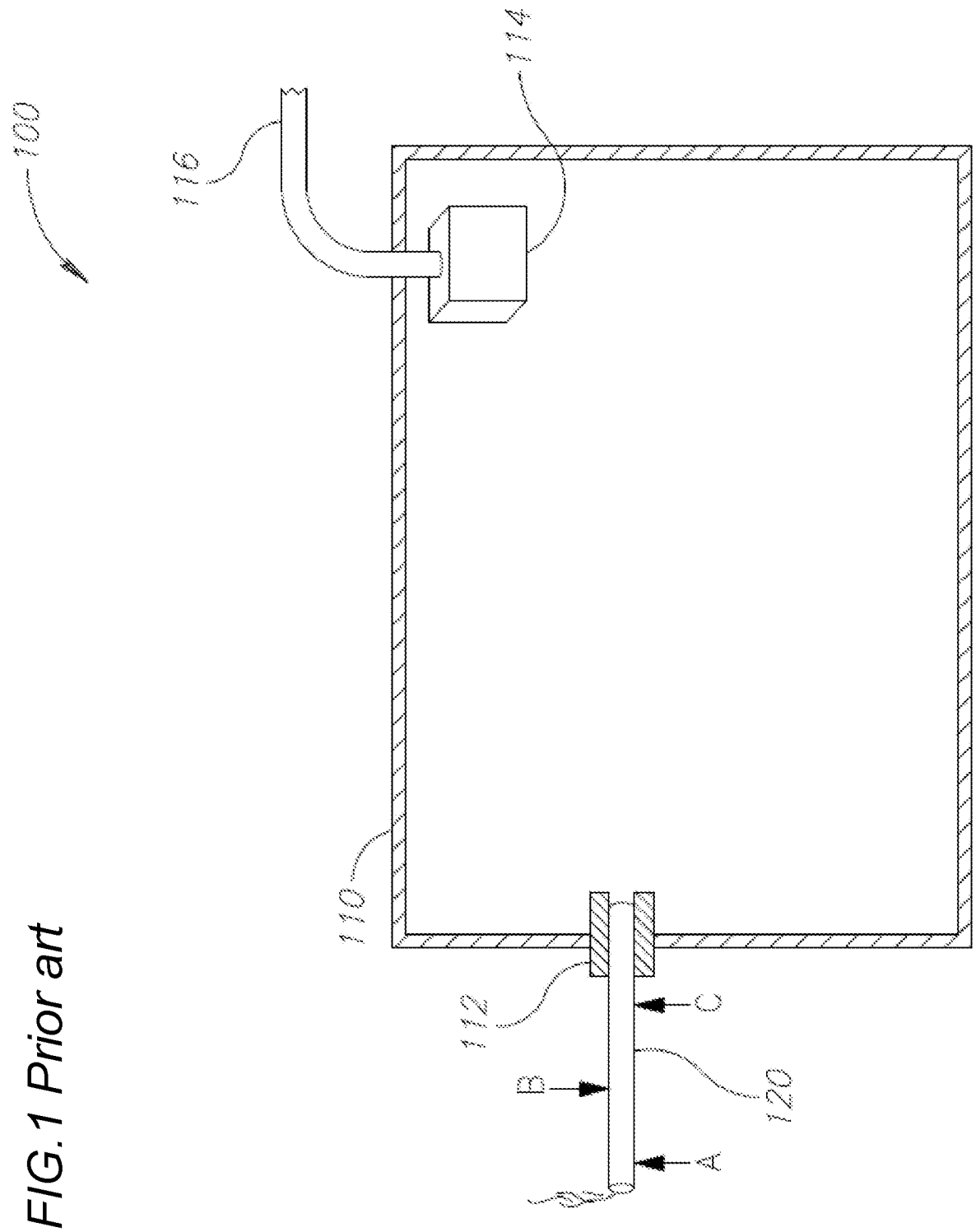
FIG. 1 depicts a prior art smoking device for obtaining smoke of plant matter using a cigarette.
Figure 2A:
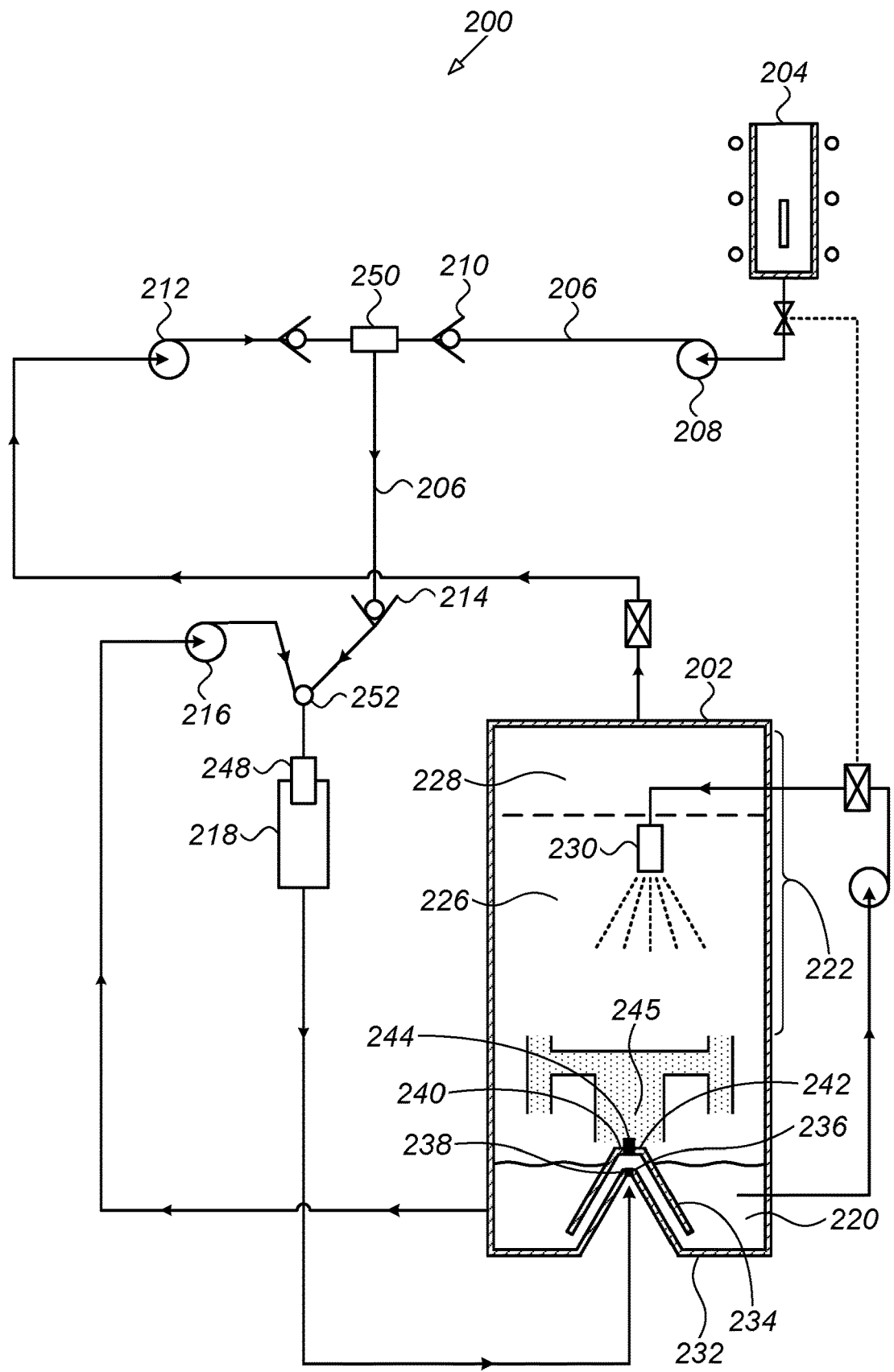
FIG. 2A depicts a schematic illustration of a vapor and smoke trapping system constructed and operative according to some embodiments of the invention.

Reference is now made to FIG. 2A which depicts a schematic illustration of vapor and smoke (vapor, fume, smoke and the like are interchangeable and are termed herein for short as "smoke") capturing (or trapping) system 200 constructed and operative according to some embodiments of the invention.

Gas and smoke trapping system 200 may include smoke chamber trap 202, combustion chamber 204, smoke conveying conduit 206, first vacuum pump 208, first one-way sprayer 210, second vacuum pump 212, second one-way sprayer 214, liquid pump 216, and mixing chamber 218. System 200 includes at least one pump, such as pumps 208, 212, or 216, which is effective to eventually pump liquid solvent from pool 220 to a fog condenser (such as fog condenser 230) for precipitating and/or urging condensation of fog-sized droplets.

Smoke chamber trap 202 includes a bottom pool 220 containing reservoir 221 of a liquid solvent, gas filled portion 222, and fine mist generator 224. The liquid solvent may include least one selected from the list consisting of ethanol, acetonitrile, propylene glycol, glycerol, water, methanol, organic solvent, and a combination of any of the above.

Gas filled portion 222 includes:

(I) Lower smog portion 226 containing fog-size droplets of the liquid solvent into which vapor or smoke is introduced;

(II) Upper clear portion 228 in which the concentration of smoke and fog droplets is decreased, respective of the corresponding concentration of smoke and fog droplets in smog portion 226; and (III) fog precipitator 230 disposed between smog portion 226 and clear portion 228 for precipitating the droplets in smog portion 226 into pool 220.

Fog precipitator 230 may for example feature one of the following, and the like:

a condensation chimney in which fog condenses and drips back to the reservoir;

a sprinkler that sprays liquid solvent "rainfall";

perforated-grid-lattice—reticulation barrage on which fog condenses and drips back to the reservoir; and/or cooled condensation piping-radiator.

In accordance with some embodiments of the present invention, smoke chamber trap 202 further includes:

(a) a closed loop gas circulator 231 for withdrawal of gas from clear portion 228 by its suction under pressure and recirculation through fine mist generator 224 into smog portion 226; and (b) smoke conveying conduit 206 for conveying fresh smoke into gas circulator 231 at smoke introduction junction 252.

Fine mist generator 224 is partially immersed in reservoir 221 for streaming a jet of fog-sized droplets of the liquid solvent towards the smog portion 226. Fine mist generator 224 includes a fixed bottom element 232, an upper element 234, and surface 245.

Fixed bottom element 232 and upper element 234 may have a conical, cylindrical or any other shape.

Fixed bottom element 232 emerges upward from the bottom floor of pool 220 and includes a first head 236, which is disposed above liquid level 237 of the solvent in reservoir 221 at a first distance from the bottom of said floor.

First head 236 includes an inlet opening 238 through which a jet stream of gas with smoke and solvent droplets of closed loop gas circulator 231 is continuously injected into smog portion 226.

Upper element 234 is partially immersed in the reservoir of liquid solvent disposed above fixed bottom element 232 and features a second head 240. Second head 240 is disposed at a second distance from the bottom of said floor, the second distance is greater than the first distance such that a gap is disposed between said fixed bottom element and said upper element, the gap creates a negative-pressure upon streaming, second head 240 includes outlet-opening 242, and injector 244 through which the jet stream is continuously spurting for hitting surface 245 upon entering smog portion 226. Surface 245 is positioned in front of injector 244 of upper element 234 for enhancing smoke association or dissolution in the liquid solvent by breaking down the droplets of the jet stream upon hitting surface 245 into tiny fog-sized liquid droplets and smoke-derived droplets and particles.

In accordance with some embodiments of the present invention, first head 236 and/or second head 240 may have a tapered shape, and second head 240 may be either stationary or movable. In accordance with some embodiments of the present invention, as a jet stream exits fixed bottom element 232, it lifts upper element 234 and creates a vacuum that withdraws liquid solvent from the reservoir towards injector 244.

In accordance with some embodiments of the present invention, the diameter of injector 244 is either constant, or varied, i.e., increased or decreased as desired, when manufactured or by featuring a variable diameter component, that may be controlled to alter its diameter, preferably dynamically. A significant decrease in the diameter will generally decrease the pressure of the gas mixed with the solvent (due to the Bernoulli effect), and a significant increase in the diameter will generally increase the pressure of the gas mixed with the solvent, correspondingly. Such pressure variations mix (first mixing) the mixture of solvent and gas and transform it into fog.

In accordance with the present invention, the high pressure and the increased surface area of the solvent droplets (creating micro-droplets) merge the gas/smoke into the solvent and forms fog.

As the jet of solvent and gas exits injector 244, it hits against surface 245 and breaks down into fog-sized droplets with a diameter ranging from 0.1 micrometer to 100 micrometer, which may have an average diameter of about 2 micrometer.

The increased surface area of the micrometer-sized droplets and the relatively high pressure created, as the jet of solvent and gas exits injector 244, enable continuous association or dissolution and capture of smoke and gas into the solvent.

In accordance with some embodiments of the present invention, mixing chamber 218 for enhancing dissolving of smoke into the liquid solvent, includes injector 248 for stirring and mixing which assist in association of smoke with the liquid solvent.

Injector 248 includes apertures 249 (e.g., of a grid or perforated spout) through which the stream of liquid and smoke passes upon entering mixing chamber 218, wherein apertures 249 form areas of increased pressure in the stream of liquid and gas, thereby assisting in dissolution of vapor or smoke into the liquid.

Figure 2B:
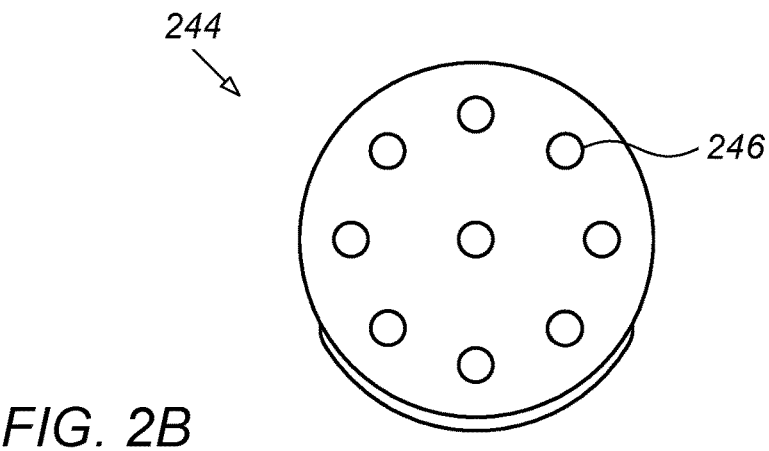
FIG. 2B shows an enlarged view of an injector used in the mixing chamber described in FIG. 2A.

Reference is now made to FIG. 2B showing an enlarged view of injector 248. As seen in FIG. 2B, injector 248 includes multiple apertures 249 through which the stream of liquid and smoke enters the precipitation chamber, wherein apertures 249 form areas of increased pressure in the stream of liquid and gas, and thereby assisting in dissolution of smoke into the liquid.

In accordance with some embodiments of the present invention, injector 248 smashes the entering jet of solvent droplets, creates areas of increased pressure in the stream of solvent droplets, and thereby enhances the absorption of smoke into the liquid solvent.

Thus, in accordance with some embodiments of the present invention, fine mist generator 224 enhances the degree of smoke absorption into the liquid solvent by breaking down the entering solvent droplets into tiny micrometer scale fog-sized droplets having a relatively high surface to volume ratio.

The degree of smoke absorption in smoke chamber trap 202 is considerably high and can reach up to about 90-97%, thus, it may not be necessary to include mixing chamber 218 in the process.

In accordance with some embodiments of the present invention, smoke trapping system 200 may include various sensors such as:
- at least one temperature sensor for monitoring the temperature throughout the process;
- at least one sensor for monitoring the composition of gases throughout the process;
- at least one sensor for monitoring the quantity of liquid solvent prior to initiating the process, throughout the process and after the process is completed.

Smoke trapping system 200 enables adding liquid solvent throughout the process as needed.

In accordance with some embodiments of the present invention, smoke trapping system 200 may include an internal conduit residue collection cleansing mechanism that is operative for washing the conduits with the liquid solvent for releasing smoke adhered to the sides of the conduits, and circulating the liquid solvent with the released smoke through the conduits into the bottom pool 220.

In accordance with some embodiments of the present invention, smoke trapping system 200 is computerized, and thus, parameters of interest may be controlled by a suitable computerized controller. Such parameters may include time duration of operation, total weight of matter to be processed, solvent weight before and after the process, pre-set temperature at the combustion chamber, pressure of liquids, gas pressure, and vacuum pressure, weight of ash, and the degree of turbidity of the solvent (for indicating the absorption of smoke), and optical means for qualitative or quantitative measurement of dissolved components (e.g., FT-IR or similar integrated detector and analysis system for in-process quantitative measurements of the compounds dissolved in the liquid).

Smoke trapping system 200 may include multiple evaporation programs each of which having a predefined processing temperature and a predefined evaporation time duration intended to suit various types of materials.

In accordance with some embodiments of the present invention, smoke depositing trapping system 200 enables four mixing stages of liquid and smoke throughout the process:
1. first mixing stage—taking place in mixing chamber 218;
2. second mixing stage—taking place as the jet stream exiting fixed bottom element 232
3. third mixing stage—taking place as the jet stream exiting upper element 234
4. forth mixing stage—taking place as the jet stream hitting surface 245 and breaking into tiny fog-sized droplets.

Figure 3:
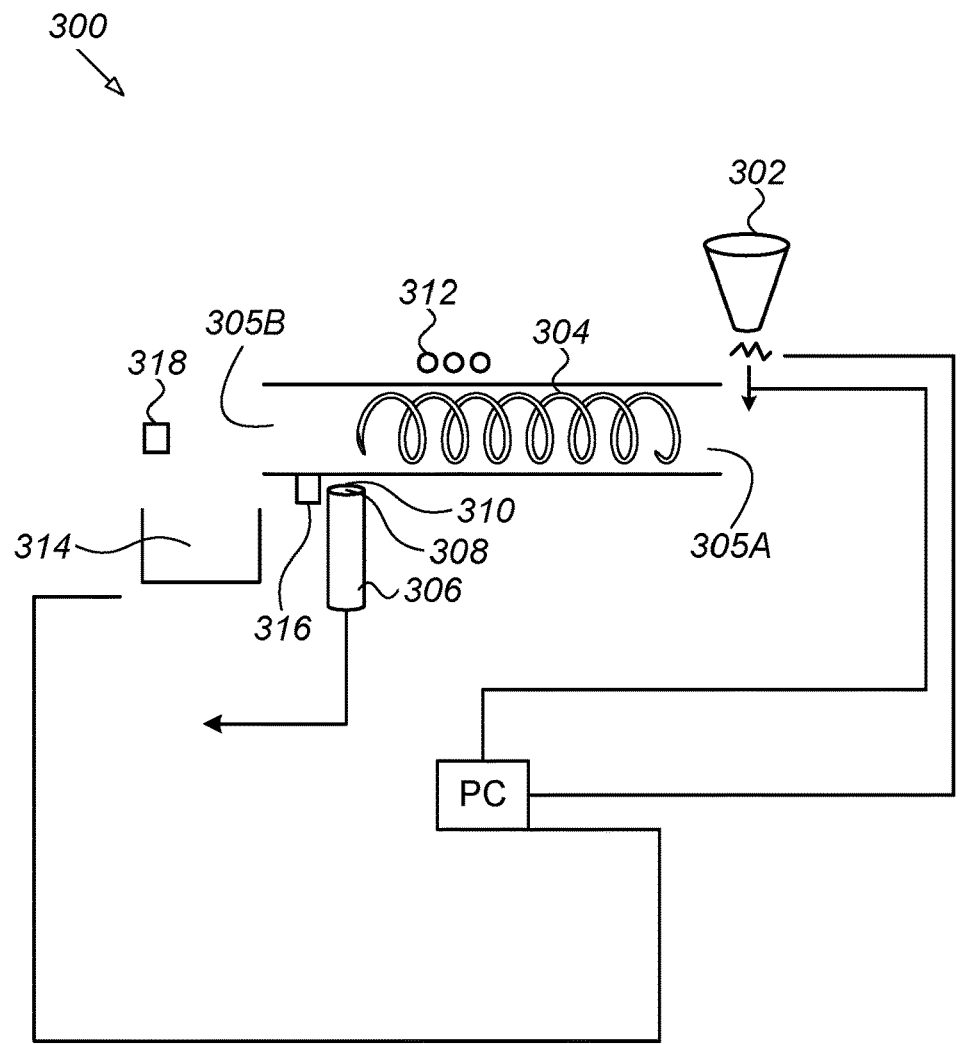
FIG. 3 illustrates a burning/vaporization apparatus constructed and operative according to some embodiments of the invention.

FIG. 3 illustrates a burning/vaporing unit 300, constructed and operative in accordance with some embodiments of the present invention. Burning/vaporing unit 300 includes weighing means 302, plant conveying conduit 304, smoke conveying conduit 306, screen 308, filter 310 heating elements 312, ash collector 314, first sensor 316, and second sensor 318.

Plant conveying conduit 304 has a proximal end 305A and a distal end 305B.

Smoke conveying conduit 306 is open at one end to plant conveying conduit 304, and is configured to allow flow of smoke from plant conveying conduit 304.

A screen 308 is placed between smoke conveying conduit 306 and plant conveying conduit 304 to prevent plant matter from entering smoke conveying conduit 306 from plant conveying conduit 304.

Filter 310 is configured to allow flow of smoke but to prevent large particles from passing through.

Burning/vaporing unit 300 includes a first sensor 316 within plant conveying conduit 304 for determination of ignition status of plant matter, and a second sensor 318 at a distance from distal end 305B for determination of ignition status of plant matter at distal end 305B.

Thus, in accordance with some embodiments of the present invention, plant matter is weighed and the weight is recorded. Plant matter is then entered through proximal end 305A and advanced to distal end 305B of plant conveying conduit 304. Plant conveying conduit 304 is accompanied with external heating elements 312 which heat plant while advancing towards distal end 304 to a temperature at which plant vapor is formed. Heating elements 312 represent a heating arrangement for continuously burning and/or vaporizing matter for producing the fresh smoke for admission into smoke conveying conduit 306.

Plant matter is advanced through plant conveying conduit 304 at a rate allowing for vapor or steam of plant matter to arrive at distal end 305B. Thus, vapor/steam is continuously drawn through plant matter in plant conveying conduit 304, through screen 308 and into smoke conveying conduit 306.

The spent plant matter falls to ash collector 314 as plant matter advances in the direction of distal end 305B. The ash is then weighted and recorded. It should be noted that in accordance with some embodiments of the present invention the heating arrangement may include weighing means for weighing the plant matter. In addition, the heating arrangement may be locked and may be operable with a code interface for preventing improper functioning.

Example

Figure 6:
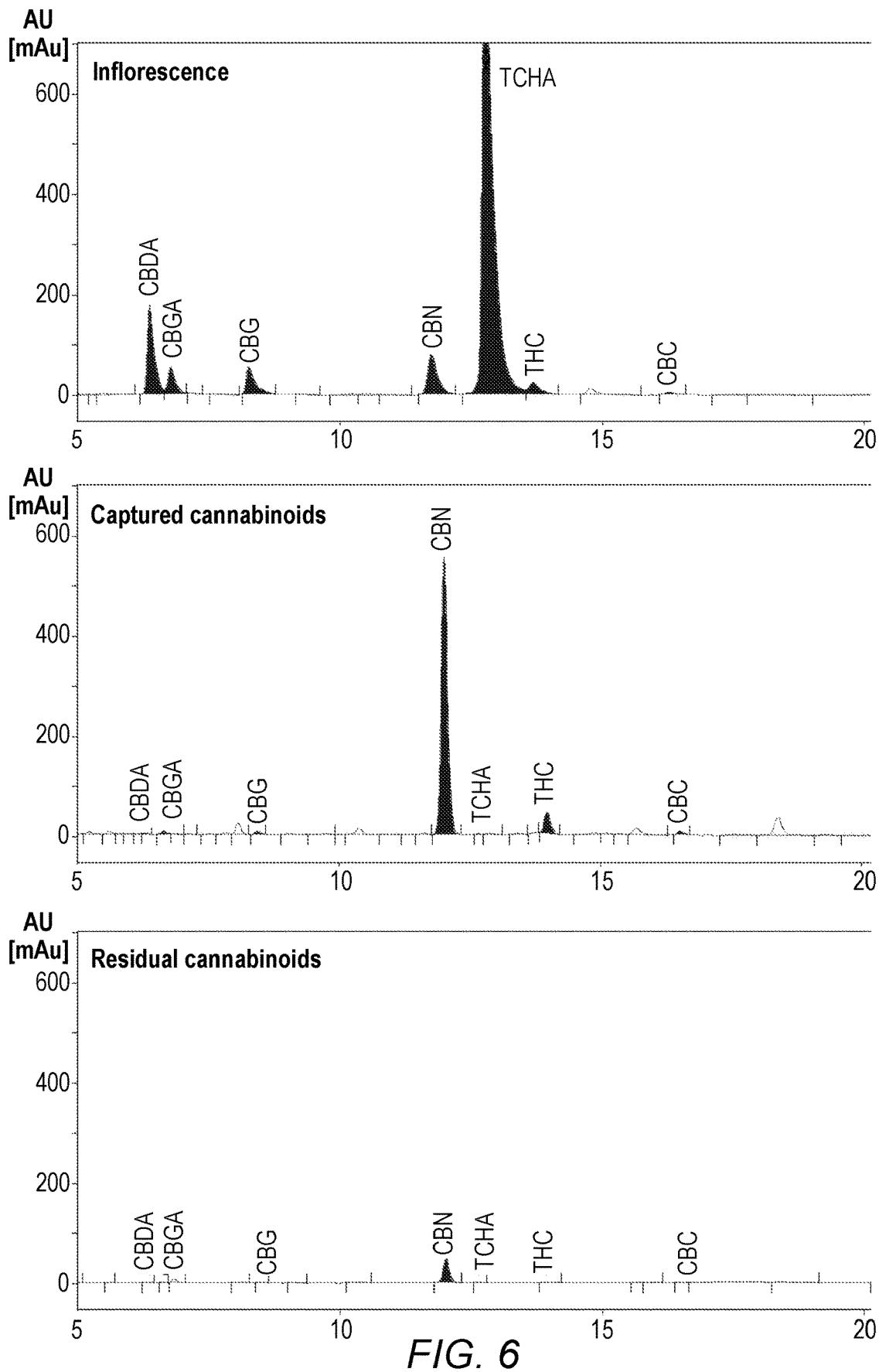
Figure 7:
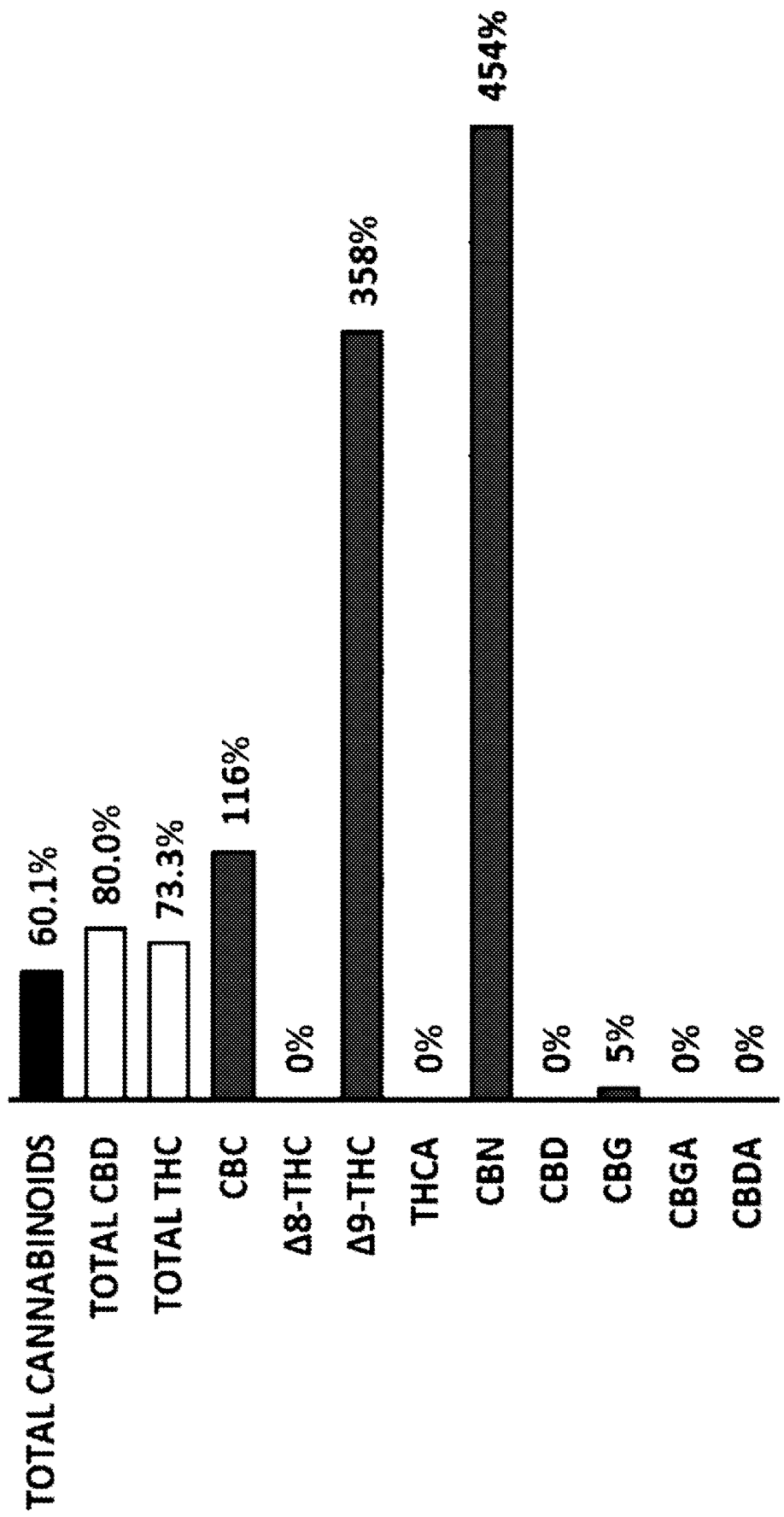
Figure 7:
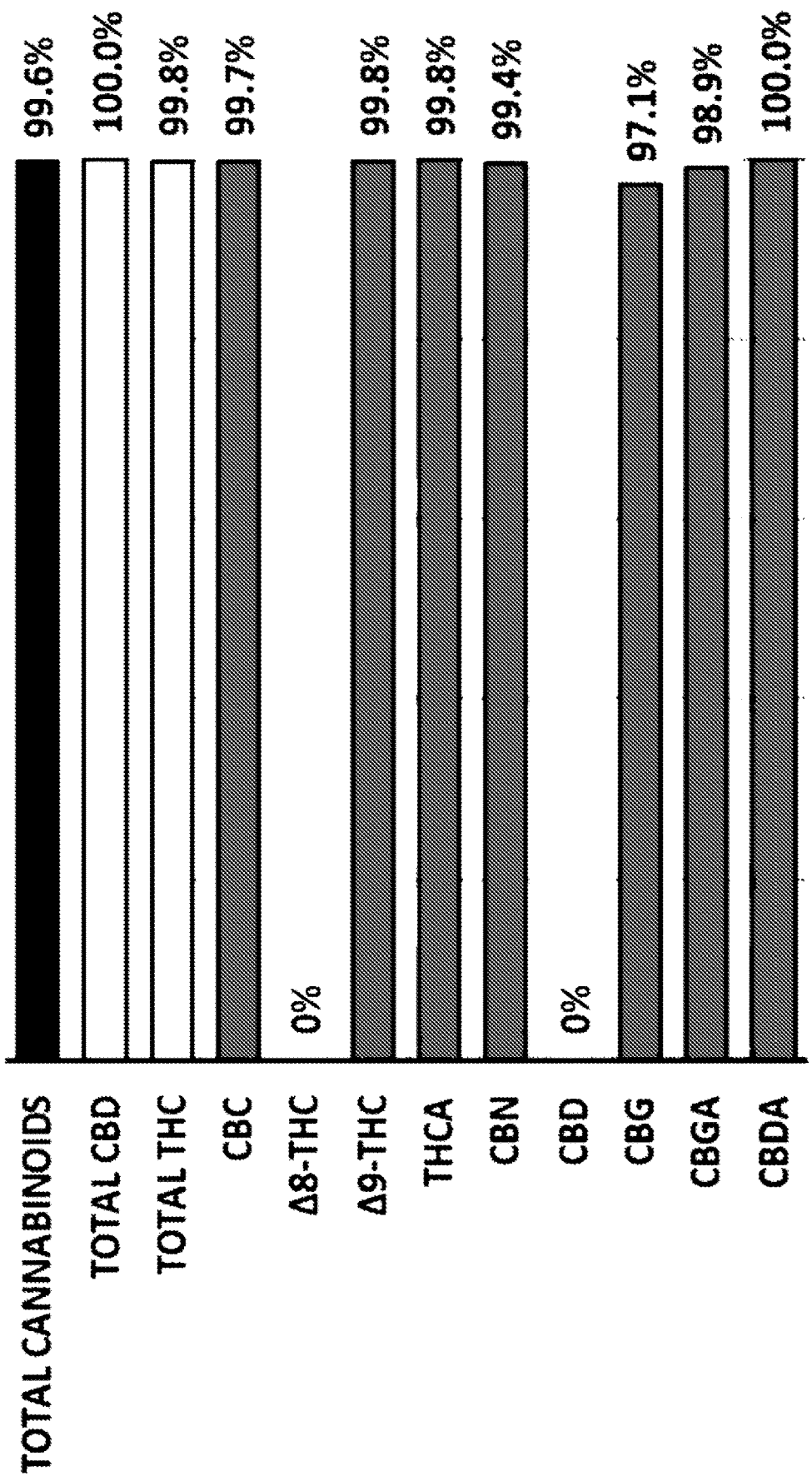

The capturing yield of nine major constituents (cannabinoids) was measured for inflorescence containing such medical constituents processed in a demonstrative system, constructed and operative in accordance with the invention. Reference is now made to FIGS. 6, 7 and 8, which present the measured presence of major constituents of inflorescence. The graphs of FIG. 6 illustrate results derived by high-pressure liquid chromatography (HPLC) and are derived from measuring optical absorption and presented in mAU (mill arbitrary units) as a function of retention time (minutes). The results are also presented for simplicity in the charts of FIG. 7 and are summarized in Table I of FIG. 8. Initial concentration of the cannabinoids in the inflorescence before burning is presented in mg/g. The percentage of extraction yield represents percentage of evaporated material after burning (calculated by analytically measuring the components in the ash remaining in the burning cell), and percentage of capturing yield was measured for the captured residue (components) and calculated with respect to the unburnt inflorescence. In particular, the measurements demonstrated that the yield percentage of CBN, Δ9-THC and CBC was increased to 454%, 358%, and 116%, respectively, which indicates creation thereof by the burning process (e.g., THCA may be a possible source for Δ9-THC, being itself a potential source for CBN) and effective yield percentage of the system therefor. It is noted that the term "total" and particularly "total cannabinoids" are used in the context of the charts for the particularly monitored constituents and do not reflect the total yield of cannabis or all of its constituents or all of its relevant constituents. It will be appreciated that the invention is not limited whatsoever to the above-mentioned measured constituents, and may feature, for example, trapping of other non-measured cannabinoids, as well as terpenes and flavonoids or any other compounds, molecular entities or molecular complexes, that may be of interest.

Operating Procedure

During the operation of smoke trapping system 200, plant matter is introduced continuously into combustion or vaporizing chamber 204 which is ignited or operated at a pre-set temperature(s).

As plant matter is burnt/vaporized at combustion chamber 204, first vacuum pump 208 acts to create a vacuum, drawing fresh smoke from combustion chamber 204 through smoke conveying conduit 206. The fresh smoke is then conveyed to first one-way sprayer 210 and introduced at point 250 where it blends with old smoke exiting from smoke chamber trap 202, and the blend is circulated by action of second vacuum pump 212. The combined stream of old and fresh smokes is conveyed to second one-way sprayer 214 and then to junction 252. At junction 252, solvent exiting from smoke chamber trap 202 and circulating by action of liquid pump 216 mingles with the smoke. The combined stream of solvent and smoke enters mixing chamber 218 through injector 248 for stirring and mixing which assist in association of smoke with the liquid solvent.

As the stream of solvent and smoke enters mixing chamber 218, it passes through the apertures of injector 248, the result of which—multiple areas of an increased pressure form in the solvent. The increased pressure enhances the degree of smoke dissolution in the liquid solvent.

To achieve an even greater degree of dissolution, the stream of solvent and smoke enters smoke chamber trap 202 where it breaks down into tiny fog-sized droplets having an average diameter of about 2 micrometers. Such tiny fog droplets are characterized by high surface area to volume ratio which enhances the degree of smoke absorption significantly.

It should be noted that since the incoming jet stream enters the section in between the two heads of fixed bottom element 232 and upper element 234, the total pressure in smoke chamber trap 202 does not accumulate but remains constant, and thus, there is no need to release pressure to the atmosphere and therefore the unblended/undissolved gas/smoke needs not be lost to the ambient atmosphere.

It should also be noted that as a pressurized jet stream of solvent and smoke exits fixed bottom element 232, it lifts upper element 234 and creates a vacuum that sucks solvent.

The process further includes a closed loop gas circulator for suction and recirculation of the gas withdrawn from clear portion 228 under pressure through fine mist generator 224 into smog portion 226, and a smoke conveying conduit 206 for conducting fresh smoke into the gas circulator at a smoke introduction junction.

During the process, a stream of air saturated with smoke exits smoke chamber trap 202 and circulates repeatedly, i.e., pumped with second vacuum pump 212 to blend with fresh smoke which comes out of combustion chamber 204. In accordance with some embodiments of the present invention, multiple blending cycles may be performed during the process.

In accordance with some embodiments, prior to entering smoke chamber trap 202, the combined stream of smoke may enter mixing chamber 218.

At the end of the process, the solvent in which the smoke is trapped can be condensed and stored in a liquid reservoir. Then the solvent is vaporized (steamed or boiled)—leaving the residue without the solvent.

Smoke/Gas Capturing/Trapping Method

Figure 4:
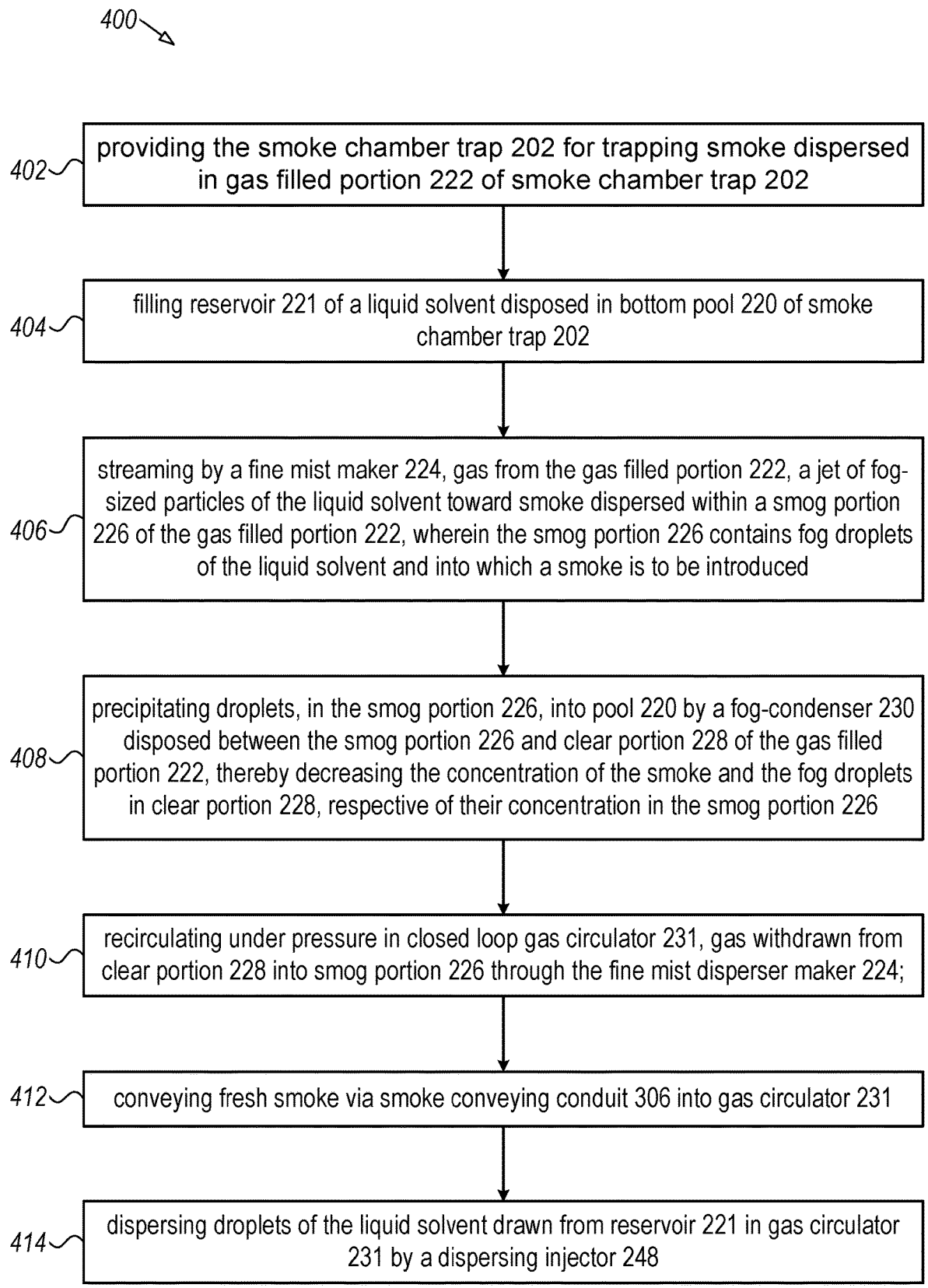
FIG. 4 is a block diagram of a smoke trapping method operative in accordance with the disclosed invention.

Reference is now made to FIG. 4 which is a block diagram of a smoke capturing (or trapping) method 400 operative in accordance with the disclosed invention. Reference is made to particular components denoted in FIGS. 2A, 2B and 3 merely for the sake of convenience, and it is noted that any similar or equivalent components are operational for the objects of method 400. In accordance with some embodiments of the present invention, smoke trapping method 400 includes the following steps:

In step 402, providing the smoke chamber trap 202 described above with reference to FIGS. 2A, 2B and 3 for capturing smoke dispersed in a gas filled portion 222 in said chamber trap 202. Smoke chamber trap 202 includes a bottom pool 220 containing reservoir 221 of a liquid solvent, gas filled portion 222, and fine mist generator 224.

In step 404, filling reservoir 221 of a liquid solvent disposed in bottom pool 220 of smoke chamber trap 202.

In step 406, streaming by a fine mist generator 224, a jet of fog-sized droplets of the liquid solvent mixed with the smoke toward a concentration of smoke dispersed within a lower smog portion 226 of the gas filled portion 222, wherein the smog portion 226 contains fog-sized droplets of the liquid solvent and into which a smoke is to be introduced. Fine mist generator 224 is partially immersed in reservoir 221 for streaming a jet of fog-sized droplets of the liquid solvent towards the smog portion 226. Fine mist generator 224 includes a fixed bottom element 232, an upper element 234, and surface 245.

In step 408, precipitating droplets, in the smog portion 226, into pool 220 by a fog precipitator 230, or a fog condenser, disposed between lower smog portion 226 and upper clear portion 228 of gas filled portion 222, thereby decreasing the concentration of the smoke and the fog-sized droplets in clear portion 228, respective of their concentration in smog portion 226.

In step 410, recirculating under pressure, in closed loop gas circulator 231, gas withdrawn from clear portion 228 into smog portion 226 through fine mist generator 224. Closed loop gas circulator 231 is used for withdrawal of gas from clear portion 228 via suction under pressure and recirculation through fine mist generator 224 into smog portion 226;

In step 412, conveying (conducting) fresh smoke via smoke conveying conduit 206 into gas circulator 231 at smoke introduction junction 252; and In step 414, which is optional, dispersing droplets of the liquid solvent drawn from reservoir 221 in gas circulator 231, downstream of the smoke introduction junction 252. This can be done at preliminary mixing chamber 218 by a dispersing injector 248. The combined stream of solvent and smoke enters mixing chamber 218 through injector 248 for stirring and mixing which assist in association of smoke with the liquid solvent.

Figure 5:
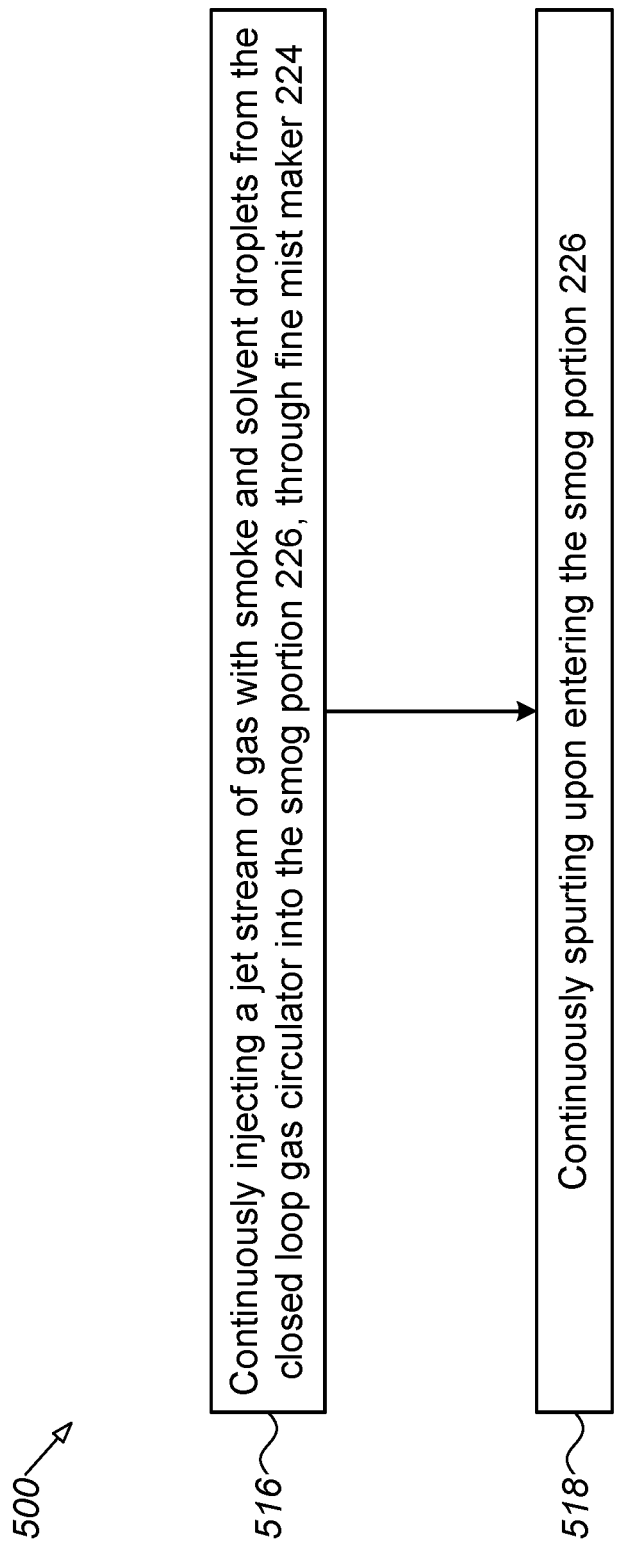
FIG. 5 is a block diagram of sub-procedures that are optionally added to the smoke trapping method of FIG. 4.

Reference is now made to FIG. 5 which is a block diagram 500 of sub-procedures that may be included in procedure 406 of streaming by fine mist generator 224. Procedure 406 may include the following sub-procedures:

1. In step 516, continuously injecting a jet stream of gas with smoke and solvent droplets from the closed loop gas circulator into the smog portion 226, through fine mist generator 224.
2. In step 518, continuously spurting the jet stream through injector 244 of upper element 234 upon entering into smog portion 226, wherein the jet stream creates a negative pressure in the gap between fixed bottom element 232 and upper element 234, wherein the negative pressure withdraws the liquid solvent from reservoir 221 toward injector 244, and fine mist generator 224 breaks down the jet stream into fog-sized particles having a relatively high surface to volume ratio. For example, continuously spurting upon entering the smog portion 226, the injected jet stream through upper element 234 which is partially immersed in reservoir 221 of liquid solvent and disposed above fixed bottom element 232.

In accordance with some embodiments of the present invention, a method of preparing for storage liquid solvent saturated with smoke involves the following stages:
a) Providing liquid solvent saturated with smoke into a holding tank;
b) Condensing the liquid solvent;
c) weighing the liquid solvent saturated with smoke;
d) Sealing the container and attaching an RFID tag to the container.
e) Recording the weight and the batch number of the container and keeping it stored (in a computer, cloud, etc.).

In accordance with some embodiments of the present invention, any receiving system, which is similar to the preparation system used for preparing the tank for storage, may be used for opening the tank. Prior to opening the tank, the receiving system may weigh the tank, and compare the weight, the batch number and the RFID to the data stored by the preparation system, e.g., in the cloud.

If the above data matches the data stored in the cloud, and if the operator has permission to access the machine, the receiving system may allow opening of the tank.

For safety purposes, i.e., for preventing theft or tampering, illegal opening of the tank may cause the release of chemical(s) that may destroy the contents of the tank.

Aside to combustion chamber 204 described in FIG. 2A, various other heating arrangements may be used for combustion, burning, smoking, vaporizing, or steaming of plant matter.

It should be noted that the pre-set temperature in the combustion chamber is preferably pre-set at or lower than 230° C., or below a temperature which may cause a spontaneous combustion of the matter, a spontaneous ignition, and/or a spontaneous further increase in temperature (e.g., increasing above 230° C. and up to 350° C., and even higher) to avoid such an undesirable spontaneous occurrence.

It will be appreciated by persons skilled in the art that the technique is not limited to what has been particularly shown and described hereinabove.

In the description and claims of the present application, each of the verbs, "comprise," "include" and "have," and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments include different features, not all of which are required in all embodiments of the invention. Some embodiments utilize only some of the features or possible combinations of the features. Variations of embodiments of the invention that are described, and embodiments of the invention including different combinations of features noted in the described embodiments, will occur to persons of the art. The scope of the invention is limited only by the claims.

The invention claimed is:

1. A smoke capturing system comprising:

(a) a smoke trap chamber for precipitating smoke dispersed in said smoke trap chamber, said chamber comprising:

(1) a bottom pool for comprising a reservoir of a liquid solvent;

(2) a gas filled portion, comprising:

(I) a lower smog portion containing droplets of said liquid solvent and into which the smoke is introduced;

(II) an upper clear portion in which a concentration of said smoke and said droplets is decreased, respective of their concentration in said smog portion; and (III) a fog condenser disposed between said smog portion and said clear portion, wherein said fog condenser is configured to precipitate said droplets in said smog portion into said pool; and (3) a fine mist generator for streaming a jet of droplets of said liquid solvent mixed with said smoke, toward a concentration of said smoke in smog portion, said fine mist generator, comprising:

(I) a fixed bottom element emerging upward from a bottom floor of said bottom pool, comprising a first head disposed above a liquid level of said solvent in said reservoir, said first head positioned at a first distance from a fixed bottom of said bottom floor, said first head comprising an inlet-opening through which a jet stream of said closed loop gas circulator is continuously injected into said smog portion;

(II) an upper element, either stationary or movable, partially immersed in said reservoir of said solvent, said upper element comprising a second head comprising an outlet opening disposed in the path of said jet stream, wherein said second head is positioned at a second distance from the fixed bottom of said bottom floor, wherein said second distance is greater than said first distance such that a gap is disposed between said fixed bottom element and said upper element, said gap operative to create a negative pressure upon streaming of the jet of droplets of said liquid solvent mixed with said smoke, and wherein the upper element further comprises an injector fitted onto said outlet-opening through which said jet stream continuously spurts prior to entering said smog portion, and (III) a surface positioned in front of said injector of said upper element for enhancing smoke association or dissolution in said solvent by breaking down said droplets of said jet stream upon hitting said surface into liquid droplets and smoked derived droplets and particles;

(b) a closed loop gas circulator for withdrawing said gas from said clear portion and recirculating said gas under pressure through said fine mist generator into said smog portion; and (c) a smoke conveying conduit for conveying fresh smoke into said gas circulator.

2. The smoke capturing system according to claim 1, further comprising a liquid solvent preliminary mixing circulator, for dispersing droplets of a liquid solvent drawn from said reservoir into said gas circulator.

3. The smoke capturing system according to claim 1, wherein at least one of said first head and said second head is tapered.

4. The smoke capturing system according to claim 1, wherein said jet stream comprises gas comprises smoke and solvent droplets.

5. The smoke capturing system according to claim 1, wherein said droplets comprise a diameter ranging from 0.1 micrometer to 100 micrometers, and/or an average diameter of about 2 micrometers.

6. The smoke capturing system according to claim 1, wherein a diameter of said injector is either constant, or varied, wherein said varied diameter facilitates correspondingly varying a pressure of a jet stream of a gas, wherein said gas comprises the smoke and solvent droplets.

7. The smoke capturing system according to claim 1, further comprising a heating arrangement for continuously burning and/or vaporizing a matter for producing said fresh smoke, wherein said heating arrangement comprises a weighing means for weighing said matter for producing said fresh smoke for admission into said smoke conveying conduit.

8. The smoke capturing system according to claim 7, wherein said heating arrangement is configured to heat said matter at a temperature pre-set at or lower than 230° C., or a temperature which may cause a spontaneous combustion or ignition of the matter, or a spontaneous further increase in temperature.

9. The smoke capturing system according to claim 1, further comprising at least one pump for pumping liquid solvent from said pool to said fog condenser for precipitating and/or urging condensation of said droplets.

10. The smoke capturing system according to claim 1, wherein said liquid solvent comprises at least one solvent selected from the list consisting of:

ethanol;
acetonitrile;
propylene glycol;
glycerol;
water;
methanol;
organic solvent; and
a combination of any of the above.

11. The smoke capturing system according to claim 1, further comprising at least one sprayer connected to said smoke conveying conduit and to a liquid solvent conduit, wherein said at least one sprayer is configured to mix smoke and liquid traversing said at least one sprayer.

12. The smoke capturing system according to claim 1, further comprising a controller for setting and controlling parameters, said parameters comprising at least one parameter selected from the list consisting of:

time duration of operation;
total weight of matter to be processed;
solvent weight before and after a process;
pre-set temperature at a combustion chamber;
pressure of liquids;

gas pressure;
vacuum pressure;
weight of ash; and
a degree of turbidity of said liquid solvent for indicating an absorption level of the smoke; and
an optical means for qualitative or quantitative measurement of dissolved components.

13. The smoke capturing system according to claim 1, further comprising at least one temperature sensor.

* * * * *